(12) United States Patent
Goldfarb et al.

(10) Patent No.: US 9,764,742 B1
(45) Date of Patent: Sep. 19, 2017

(54) DRIVER IDENTIFICATION AMONG A LIMITED POOL OF POTENTIAL DRIVERS

(71) Applicant: STATE FARM MUTUAL AUTOMOBILE INSURANCE COMPANY, Bloomington, IL (US)

(72) Inventors: Meghan Sims Goldfarb, Champaign, IL (US); Scott Thomas Christensen, Salem, OR (US); Taylor Michael Thiel, Urbana, IL (US); Anuj Dahiya, Naperville, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 65 days.

(21) Appl. No.: 15/010,399

(22) Filed: Jan. 29, 2016

(51) Int. Cl.
*B60W 40/09* (2012.01)
*G08G 1/01* (2006.01)
(Continued)

(52) U.S. Cl.
CPC ............. *B60W 40/09* (2013.01); *B60W 30/00* (2013.01); *G01C 21/34* (2013.01); *G02B 27/00* (2013.01); *G02B 27/01* (2013.01); *G02B 27/0172* (2013.01); *G05D 1/00* (2013.01); *G06K 9/00* (2013.01); *G06Q 10/06* (2013.01); *G06Q 10/08* (2013.01); *G06Q 10/083* (2013.01); *G06Q 40/08* (2013.01); *G07B 15/06* (2013.01);
(Continued)

(58) Field of Classification Search
CPC ....... H04M 3/00; G06Q 40/08; G06Q 10/083; G06Q 1/052; G06Q 10/08; G06Q 50/28; G09B 19/16; G08C 17/02; B60W 40/09; B60W 30/00; G05D 1/00; B60Q 9/00; H04W 4/04; H04W 4/046; G02B 27/01; G02B 27/00; G02B 27/0172; G06K 9/00; G08G 1/0112; G07B 15/06; G01C 21/34; G07C 5/00
See application file for complete search history.

(56) References Cited

U.S. PATENT DOCUMENTS

2012/0253892 A1* 10/2012 Davidson ............... G06Q 10/08
705/7.42
2014/0278574 A1* 9/2014 Barber .................. B60W 40/09
705/4

(Continued)

OTHER PUBLICATIONS

Driver Telematics Analysis, "Use Telematic Data to Identify a Signature", https://www.kaggle.com/c/axa-driver-telematics-analysis, retrieved from the internet on Jan. 29, 2016, 2 pages.

*Primary Examiner* — Behrang Badii
(74) *Attorney, Agent, or Firm* — Marshall, Gerstein & Borun LLP; Randall G. Rueth

(57) ABSTRACT

Historical vehicle telematics data, corresponding to trips known to have been driven by specific persons within a limited pool of potential drivers, may be processed to generate a statistical model that is customized for those persons. Once generated, the custom statistical model may be used to process vehicle telematics data from trips where it is known that the driver was one of the drivers in the pool of drivers, but the specific identify of the driver is not known. Because the statistical model is specifically optimized or designed to distinguish among the drivers in the pool, the model may be more accurate than universal driver identification models.

20 Claims, 5 Drawing Sheets

(51) Int. Cl.
| | |
|---|---|
| G07B 15/06 | (2011.01) |
| G06Q 10/06 | (2012.01) |
| G07C 5/00 | (2006.01) |
| G01C 21/34 | (2006.01) |
| G06Q 10/08 | (2012.01) |
| G06Q 40/08 | (2012.01) |
| G08G 1/052 | (2006.01) |
| H04W 4/04 | (2009.01) |
| B60W 30/00 | (2006.01) |
| G05D 1/00 | (2006.01) |
| H04W 4/02 | (2009.01) |
| G02B 27/00 | (2006.01) |
| G06K 9/00 | (2006.01) |
| G02B 27/01 | (2006.01) |
| G10L 25/48 | (2013.01) |
| H04W 76/02 | (2009.01) |

(52) U.S. Cl.
CPC ............. *G07C 5/00* (2013.01); *G08G 1/0112* (2013.01); *G08G 1/052* (2013.01); *G10L 25/48* (2013.01); *H04W 4/02* (2013.01); *H04W 4/04* (2013.01); *H04W 4/046* (2013.01); *H04W 76/02* (2013.01)

(56) References Cited

U.S. PATENT DOCUMENTS

| | | | |
|---|---|---|---|
| 2015/0248795 A1* | 9/2015 | Davidson | G01C 21/34 701/1 |
| 2015/0294422 A1* | 10/2015 | Carver | G06Q 40/08 705/4 |
| 2016/0026182 A1* | 1/2016 | Boroditsky | H04L 67/306 701/23 |

* cited by examiner

DRIVER IDENTIFICATION AMONG A LIMITED POOL OF POTENTIAL DRIVERS

FIELD OF THE DISCLOSURE

The present disclosure generally relates to vehicle telematics and, more specifically, to systems and methods for identifying drivers based upon vehicle telematics data.

BACKGROUND

Current technologies make use of vehicle telematics data to assess driving behavior. For example, the telematics data may be collected and analyzed to determine the acceleration, braking and/or cornering habits of a driver of a vehicle, and the results of the analysis may be used to measure the performance of the driver over time. The telematics data may be generated by sensors on the vehicle, or by a personal mobile electronic device (e.g., smart phone) carried by the driver, for example. The measured performance may then be used for various purposes, such as modifying an insurance rating of the driver.

Typically, the insurance policy with which a particular set of vehicle telematics data is associated is known. If the vehicle telematics data is generated by a personal data collection device (e.g., a smart phone), for example, the data may include a unique identifier of the driver and/or data collection device, which can be matched to a particular auto insurance policy. As another example, if the vehicle telematics data is generated by a data collection device installed in a vehicle, the data may include a unique identifier of the vehicle and/or data collection device, which can likewise be matched to a particular auto insurance policy. In either case, the insurance policy may specify a small pool of potential drivers (e.g., the primary insured and his or her spouse, and possibly one or more children of driving age).

However, there can still be some level of ambiguity concerning who was driving a vehicle when a particular set of vehicle telematics data was generated. If a set of vehicle telematics data is received from two different personal data collection devices (e.g., two smart phones), for example, with each set of data reflecting the same driving session or trip, it may be unclear which one of the two device owners was driving during that trip, and which was merely a passenger. As another example, if the data collection device is, or is a part of, a vehicle telematics system installed in a family's vehicle, it may be unclear which family member (disclosed as a potential driver on the policy) was driving when data was collected for a particular driving session or trip.

Thus, an insurance provider may not know whether a particular portion of the vehicle telematics data (e.g., a portion corresponding to a particular driving trip) reflects the driving performance of a primary insured, or the driving performance of another person disclosed on the insurance policy. If driving performance is not correctly attributed, the insurance provider may be unable to accurately assess the risk associated with particular drivers. For these and other reasons, techniques for accurately and efficiently attributing sets of vehicle telematics data to individuals may be beneficial.

BRIEF SUMMARY

The present embodiments may, inter alia, utilize historical vehicle telematics data to build and utilize a custom statistical model that is specific to a particular set of two or more drivers. By using a statistical model that focuses on those driving behaviors that are particularly good at distinguishing among drivers in a specific, known set of drivers, vehicle telematics data may be attributed to different individuals more accurately and/or efficiently. By increasing the accuracy and/or efficiency of data attribution in these situations, an insurance provider or other entity may more accurately assess driving risk and/or performance for one or more individuals.

In one aspect, a method of identifying a driver in the presence of vehicle telematics data from multiple data collection devices may include retrieving, by a server and from a vehicle telematics database, historical vehicle telematics data including (i) first historical vehicle telematics data known to correspond to one or more trips driven by a first person, and (ii) second historical vehicle telematics data known to correspond to one or more trips driven by a second person. The first historical vehicle telematics data and the second historical vehicle telematics data may be indicative of a plurality of driving behaviors for the first person and the second person, respectively. The method may also include generating, by the server and based upon both the first historical vehicle telematics data and the second historical vehicle telematics data, a custom statistical model specific to the first person and the second person. The custom statistical model may (i) give greater weight to those driving behaviors, of the plurality of driving behaviors, having greater predictive power with respect to distinguishing driving by the first person from driving by the second person, and (ii) give less or no weight to those driving behaviors, of the plurality of driving behaviors, having less or no predictive power with respect to distinguishing driving by the first person from driving by the second person. The method may also include receiving, at the server, first vehicle telematics data collected by a first data collection device during a first trip, receiving, at the server, second vehicle telematics data collected by a second data collection device during the first trip, determining, by the server, one or both of (i) a first measure indicating likelihood that the first trip was driven by the first person, and (ii) a second measure indicating likelihood that the first trip was driven by the second person, at least in part by processing one or both of the first vehicle telematics data and the second vehicle telematics data according to the custom statistical model, and, based upon one or both of the first measure and the second measure, assigning, by the server, the first trip to either the first person or the second person.

In another aspect, a server may include one or more processors and a memory storing instructions. The instructions may, when executed by the server, cause the server to retrieve, from a vehicle telematics database, historical vehicle telematics data including (i) first historical vehicle telematics data known to correspond to one or more trips driven by a first person, and (ii) second historical vehicle telematics data known to correspond to one or more trips driven by a second person. The first historical vehicle telematics data and the second historical vehicle telematics data may be indicative of a plurality of driving behaviors for the first person and the second person, respectively. The instructions may also cause the one or more processors to generate, based upon both the first historical vehicle telematics data and the second historical vehicle telematics data, a custom statistical model specific to the first person and the second person. The custom statistical model may (i) give greater weight to those driving behaviors, of the plurality of driving behaviors, having greater predictive power with respect to distinguishing driving by the first person from driving by the second person, and (ii) give less or no weight to those driving behaviors, of the plurality of driving behaviors, having less or no predictive power with respect to distinguishing driving by the first person from driving by the second person. The instructions may also cause the one or more processors to receive first vehicle telematics data collected by a first data collection device during a first trip, receive second vehicle telematics data collected by a second data collection device during the first trip, determine one or both of (i) a first measure indicating likelihood that the first trip was driven by the first person, and (ii) a second measure indicating likelihood that the first trip was driven by the second person, at least in part by processing one or both of the first vehicle telematics data and the second vehicle telematics data according to the custom statistical model, and, based upon one or both of the first measure and the second measure, assign the first trip to either the first person or the second person.

In another aspect, a method of identifying a driver given a limited pool of potential drivers may include identifying, by a server, a plurality of persons that may potentially be driving while a particular data collection device collects vehicle telematics data, and retrieving, by the server and from a vehicle telematics database, a plurality of sets of historical vehicle telematics data each known to correspond to one or more trips driven by a respective one of the plurality of persons. Each set of the plurality of sets of historical vehicle telematics data may be indicative of a plurality of driving behaviors for the respective one of the plurality of persons. The method may also include generating, by the server and based upon the plurality of sets of historical vehicle telematics data, a custom statistical model specific to the plurality of persons. The custom statistical model may (i) give greater weight to those driving behaviors, of the plurality of driving behaviors, having greater predictive power with respect to distinguishing driving by different persons among the plurality of persons, and (ii) give less or no weight to those driving behaviors, of the plurality of driving behaviors, having less or no predictive power with respect to distinguishing driving by different persons among the plurality of persons. The method may also include receiving, at the server, a first set of vehicle telematics data collected by the particular data collection device during a first trip, determining, by the server, at least a first measure indicating likelihood that the first trip was driven by a first person of the plurality of persons, at least in part by processing the first set of vehicle telematics data according to the custom statistical model, and, based upon at least the first measure, assigning, by the server, the first trip to either (i) the first person, or (ii) a different one of the plurality of persons or a category of persons that does not include the first person.

BRIEF DESCRIPTION OF THE DRAWINGS

The figures described below depict various aspects of the systems and methods disclosed herein. It should be understood that each figure depicts an embodiment of a particular aspect of the disclosed systems and methods, and that each of the figures is intended to accord with one possible embodiment thereof.

DETAILED DESCRIPTION

Figure 1:
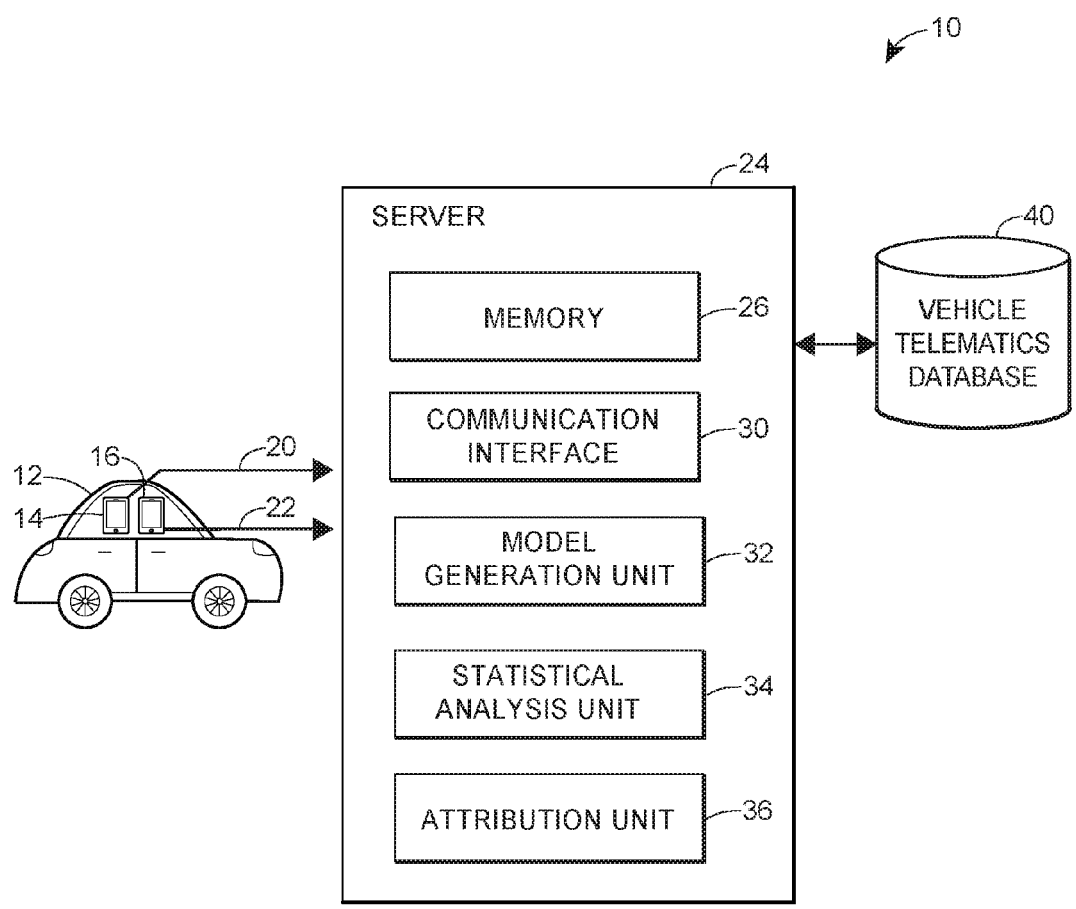
FIG. 1 depicts an exemplary environment in which vehicle telematics data may be generated, collected, and attributed to individuals within a particular pool of drivers, according to one implementation.

Aspects of the present invention relate to attributing vehicle telematics data to individuals, particularly in scenarios where there exists only a small pool of potential or expected drivers. The vehicle telematics data may include any sensed or monitored information from which driving behaviors may be calculated or otherwise inferred. While the driver associated with a particular set of vehicle telematics data may not initially be known, a small pool of potential or expected drivers may be known (e.g., with a moderate or high level of confidence). If vehicle telematics data is collected from two personal mobile electronic devices (e.g., smart phones) during a single trip, for example, and if the users of the two mobile electronic devices are known, it may be assumed that the pool includes exactly two drivers (i.e., the two mobile electronic device users). As another example, if vehicle telematics data is collected from a telematics system installed in a vehicle during a trip, and if it is known that the vehicle is covered under a particular insurance policy, it may be assumed that the pool includes, and only includes, all of the drivers listed on the policy. As used herein, a "trip" may correspond to a single driving session as measured from the time of ignition to the time of stopping the vehicle engine, or any other criteria that would very likely correspond to only a single driving session (e.g., vehicle movement that occurs after a period of no movement for at least 30 minutes, and before a subsequent period of no movement for at least 30 minutes, etc.).

In one aspect, historical vehicle telematics data is retrieved from a database for each driver in the pool of potential drivers, and processed to generate a custom statistical model that is specific to those potential drivers. The historical vehicle telematics data may include data collected over a number of trips for each of the potential drivers, for example. The driver for each portion of the historical vehicle telematics data may be known for various different reasons. For example, each portion of the data may have been collected by a smart phone of a driver in the driver pool, for a trip in which no other drivers (in the driver pool or otherwise) collected or provided vehicle telematics data.

The custom statistical model may generally be built by determining which driving behaviors are more predictive (i.e., better at distinguishing between drivers in the potential driver pool) than others, and utilizing (and/or more heavily weighting) those driving behaviors within the model. A machine learning algorithm may be used to build the custom statistical model, for example. Once generated, the custom statistical model may be used to identify the driver associated with other sets of vehicle telematics data. In this manner, drivers may be distinguished or identified more effectively than if a universal model were applied. For example, it may be known that acceleration patterns while driving between 0 and 20 miles per hour are, in general, highly correlated with the specific driver, while acceleration patterns while driving between 40 and 60 miles per hour are generally not highly correlated with the specific driver. In one scenario, however, it may be determined that, counter-intuitively, two particular drivers have very similar habits with respect to acceleration patterns between 0 and 20 miles per hour, but very different habits with respect to acceleration patterns between 40 and 60 miles per hour. The custom statistical model may therefore afford less (or no) weight to the former and more to the latter, contrary to the more universal trends.

These and other aspects and implementations of the invention, which are described in further detail below, may provide various different benefits. For example, a custom statistical model may distinguish drivers more effectively than a universal statistical model that is not customized to the pool of potential drivers. This may, in turn, permit an insurance provider to more accurately calculate risk scores or ratings for individual drivers, and set insurance premiums (or perform underwriting, etc.) in a manner that reflects those risk scores or ratings.

FIG. 1 depicts an exemplary environment 10 in which vehicle telematics data may be generated, collected, and attributed to individuals, according to one implementation. As illustrated in FIG. 1, the environment 10 may include a vehicle 12. The vehicle 12 may carry data collection devices 14, 16. The data collection devices 14, 16 may be personal mobile electronic devices, such as smart phones, tablets or phablets, that are carried or mounted within vehicle 12. Each of data collection devices 14, 16 may be configured to collect various types of telematics data, including data that is generated by one or more sensors of the data collection devices 14, 16 (e.g., a camera, gyroscope, accelerometer, etc.) and/or data that is generated by one or more subsystems of vehicle 12 and transmitted to data collection devices 14, 16 (e.g., via Bluetooth links, USB ports, etc.).

The vehicle telematics data collected by the data collection devices 14, 16 may include any data that can be sensed or monitored and used to calculate or otherwise infer driving behaviors. For example, the data may include any one or more of velocity information, acceleration information, braking information, steering information, location/position information (e.g., generated by a global positioning system (GPS) device of the data collection device 14 or 16, or installed in vehicle 12), translational and/or rotational G-force information (e.g., generated by a gyroscope), on-board diagnostic information, information collected by a camera, video camera, LiDAR, radar or other device sensing an environment external to the vehicle (e.g., sensing proximity to other vehicles or other objects, orientation with respect to other vehicles or other objects, etc.), automated safety and/or control system information (e.g., adaptive cruise control status and/or when cruise control is engaged/disengaged, forward and/or rear collision warning system outputs, lane departure system outputs, electronic stability control system status, etc.), and so on. In some implementations, the vehicle telematics data includes at least acceleration and location data for vehicle 12.

Data collection devices 14 and 16 may send transmissions 20 and 22, respectively, to a server 24, where the transmissions 20 and 22 include the sets of vehicle telematics data collected by the devices 14 and 16, respectively. The transmissions 20 and 22 may include at least vehicle telematics data that data collection devices 14 and 16, respectively, collected over the course of a single, same trip. Thus, the telematics data within the transmission 20 and 22 may be the same (e.g., if both data collection devices 14, 16 collect data generated by systems of vehicle 12), or highly similar (e.g., if data collection devices 14, 16 generate their own data over the course of the same trip).

The transmissions 20, 22 may be sent to server 24 via wireless (e.g., cellular) transceivers of the data collection devices 14, 16, or in another suitable manner. If, data collection devices 14, 16 are equipped with Bluetooth transceivers, for example, the devices 14, 16 may transmit the collected telematics data to vehicle 12, and a transceiver of vehicle 12 may forward the data to server 26 either as separate transmissions, or in a single transmission. In other implementations, data collection devices 14, 16 may include interfaces configured to couple to a portable memory device, such as a portable hard drive or flash memory device. In some of these implementations, the portable memory device may be used to download data from the data collection devices 14, 16, and then may be manually carried to the server 16. In still other implementations, the portable memory device may be used to download telematics data from data collection devices 14, 16 to a personal computer device (e.g., a desktop computer, laptop computer, etc.), which may in turn be used to transmit the telematics data to server 24 via one or more wired and/or wireless networks.

The server 24 may include a memory 26, a communication interface 30, a model generation unit 32, a statistical analysis unit 34, and an attribution unit 36, each of which will be described in more detail below. The communication interface 30 may include hardware (e.g., one or more physical ports, one or more network interface cards, etc.) and/or software (e.g., software executed by one or more processors of server 24) configured to enable server 24 to receive transmissions of data collected by different data collection devices. If the data transmissions are made via the Internet, for example, communication interface 30 may include an Ethernet port. Vehicle telematics data received via communication interface 30 may be stored in vehicle telematics database 40, which may include one or more persistent memories (e.g., read-only memory (ROM), hard disk memory, optical disk memory, etc.). Vehicle telematics database 40 may include a relational database that associates each subset of telematics data with its source (e.g., the data collection device that collected the data, and/or an identifier of a user and/or insurance policy with which the data collection device is associated, etc.).

Generally, model generation unit 32 may use vehicle telematics data stored in vehicle telematics database 40 to build custom statistical analysis models, i.e., statistical analysis models that are each specific to a particular set or pool of two or more individuals. The model generation unit 32 may identify the members of the pool by identifying the users (e.g., owners) of the data collection devices 14, 16. Model generation unit 32 may accomplish this by processing identifiers (e.g., source addresses, user codes, etc.) in the transmissions 20 and 22 and using each of those identifiers as a key to a relational database (not shown in FIG. 1), for example.

The vehicle telematics data used to generate the custom statistical model may be historical/past data that is known to correspond to the driving of particular individuals within the identified pool. For example, vehicle telematics database 40 may include a relational database that specifies which sets of telematics data correspond to which drivers/individuals. The vehicle telematics data may be stored in vehicle telematics database 40 as raw data, and/or as sets of metrics that were calculated (e.g., by model generation unit 32 or another unit of server 24) based on the raw data. For example, vehicle telematics database 40 may store metrics indicative of how "smoothly" each driver drove various trips (e.g., as calculated based on accelerometer data, gyroscope data, etc.). As another example, vehicle telematics database 40 may store "tailgating" metrics indicative of how close, on average, each driver drove in relation to other, leading vehicles (e.g., while driving at more than a threshold speed) during various different trips. The stored vehicle telematics data may also, or instead, include virtually any other types of metrics that are indicative of particular driving behaviors. Generally, the driving behaviors may include driving behaviors that are indicative of risk level (e.g., measures of tailgating, seat belt usage, etc.), and/or driving behaviors that are not necessarily indicative of risk level. In some implementations, each metric corresponds to a particular driving behavior during a particular trip. Thus, for instance, one metric may measure smooth driving during a first trip, another metric may measure smooth driving during a second trip, and so on.

The model generation unit 32 may use any suitable technique or algorithm to build the custom statistical model, such as a machine learning algorithm, for example. Generally, model generation unit 32 may build the custom statistical model by determining which driving behaviors are more predictive (i.e., better at distinguishing between drivers in the potential driver pool) than others, and utilizing (and/or more heavily weighting) those driving behaviors within the model. For example, model generation unit 32 may analyze various driving behavior metrics stored in vehicle telematics database 40, and identify those metrics that tend to differ the most (e.g., by more than some threshold percentage) between the drivers in the pool. Thus, for instance, model generation unit 32 may decide to utilize a "smooth driving" metric if the drivers in the pool have historically had widely differing smooth driving scores/metrics, but omit a "tailgating" metric if the drivers have historically had similar tailgating scores/metrics. Alternatively, model generation unit 32 may assign a weight to each metric, where each weight reflects the degree to which the corresponding metric tends to differ between drivers in the pool. In the above scenario, for example, model generation unit 32 may decide to assign a weight of "0.92" to the smooth driving metric, and assign a weight of "0.17" to the tailgating metric.

Statistical analysis unit 34 may generally process vehicle telematics data associated with particular trips according to the custom statistical model generated by model generation unit 32, and provide outputs reflecting the results of the processing for each trip. The operation of statistical analysis unit 34 depends, of course, on the type of statistical model generated by model generation unit 32. Generally, any suitable type of statistical model may be used. In one implementation, for example, the custom statistical model is a cluster-based model. Model generation unit 32 may define a multi-dimensional vector, for instance, with each metric that was identified as having more than some threshold degree of predictive power corresponding to one dimension of the vector, and/or with respective weightings for each metric/dimension. Moreover, model generation unit 32 may use the same historical vehicle telematics that was used to identify the key metrics to map out clusters corresponding to the drivers in the known driver pool. Statistical analysis unit 34 may then process vehicle telematics data for a particular trip (e.g., a current or recent trip) by calculating each of the metrics defined by the multi-dimensional vector, and determining the cluster to which the new metric vector belongs (e.g., the cluster having a centroid nearest to the new metric vector, etc.).

As another example, the custom statistical model may be a model in which key metrics are compared on a one-by-one basis, with a total score being calculated based on all of the comparisons. Model generation unit 32 may define a list of key metrics (e.g., metrics that were identified as having more than some threshold degree of predictive power), for instance, and/or may define weightings for each metric based on the degree of predictive power. Statistical analysis unit 34 may then process vehicle telematics data for a particular trip (e.g., a current or recent trip) by calculating each of the defined key metrics, and comparing those new metrics to average metrics associated with each individual in the pool (as calculated based on the historical vehicle telematics data). A score may then be calculated for each pool member, based on these comparisons and any weightings of the metrics. Each score may reflect the likelihood that the new metrics (and thus, the corresponding trip) reflect the driving of that particular pool member, for example.

Attribution unit 36 may generally use the output/results of statistical analysis unit 34 to attribute/assign particular trips to specific pool members. As used herein, assigning a "trip" to a particular person may include assigning the portions of vehicle telematics data associated with that trip to the person, and/or assigning metric sets calculated based on those portions of vehicle telematics data to the person. The assignment may be based upon information provided by model generation unit 32. If a cluster-based model is used, for example, and if model generation unit 32 develops a first cluster of metric sets for a first driver (e.g., a user of data collection device 14) and a second cluster of metric sets for a second driver (e.g., a user of data collection device 16), attribution unit 36 may assign a particular trip to the first driver or the second driver based on whether statistical analysis unit 34 determines that the metric sets were closer to the first cluster or the second cluster.

Attribution unit 32 may assign trips to individuals by modifying data associated with the corresponding portions of vehicle telematics data (and/or the corresponding metric sets) in the vehicle telematics database 36. In one implementation and scenario where a metric set is attributable to a particular person (e.g., the primary insured), for example, attribution unit 36 may modify a relational database of vehicle telematics database 40 to indicate that the metric set (and/or corresponding vehicle telematics data) is associated with that person. In some implementations, server 24 (or another server not shown in FIG. 1) may also adjust a risk score or rating for that person based on further processing of the metric set and/or corresponding vehicle telematics data, for example.

In other implementations and/or scenarios, vehicle telematics data is collected not from data collection devices 14, 16, but instead from a single data collection device, such as a vehicle telematics system of vehicle 12. As used herein, a "data collection device" may include one or more components of a sensor/telematics system, or a single device/component. In these implementations and/or scenarios, there may be more than two drivers in the pool of potential drivers. For example, it may be known that the single data collection device is associated with an insurance policy that lists three different potential drivers. If there are more than two individuals in the pool, model generation unit 32 may optimize the custom statistical model to distinguish one particular driver (e.g., the primary insured) from all other potential drivers. Alternatively, model generation unit 32 may optimize the custom statistical model to distinguish each driver within the pool from all other drivers within the pool. In still other implementations, model generation unit 32 may optimize the custom statistical model so as to balance both of these goals.

Further, attribution unit 36 may assign some trips to drivers in a more general sense. If the model built by model generation unit 32 is optimized to distinguish the primary insured from all other (e.g., two or three other) drivers listed on an insurance policy, then attribution unit 36 may assign trips specifically to either the primary insured, or a "non-primary" category, based on the output of statistical analysis unit 34. In other implementations, attribution unit 36 assigns all trips to specific individuals within the pool of potential drivers, so long as the results returned by statistical analysis unit 34 are clear enough to make an assignment.

In one implementation, each of units 32, 34 and/or 36 may be (or may include) a respective set of one or more processors of server 24 that executes software instructions to perform the functions described above, or the units 32, 34 and/or 36 may share one or more processors of server 24. Alternatively, each of units 32, 34 and/or 36 may be a component of software that is stored in memory 26. The memory 26 may include a persistent memory such as ROM, for example. The software may be executed by one or more processors of server 24 to perform the functions described herein. In some embodiments, server 24 may include more, fewer and/or different units than are shown in FIG. 1, including units that execute other of the functions discussed herein. For example, server 24 may include a unit that generates risk scores for individuals in the pool of potential drivers based on the vehicle telematics data stored in vehicle telematics database 40 and the assignments made by attribution unit 36, and/or a unit that determines insurance premiums based on those risk scores and assignments.

Figure 2:
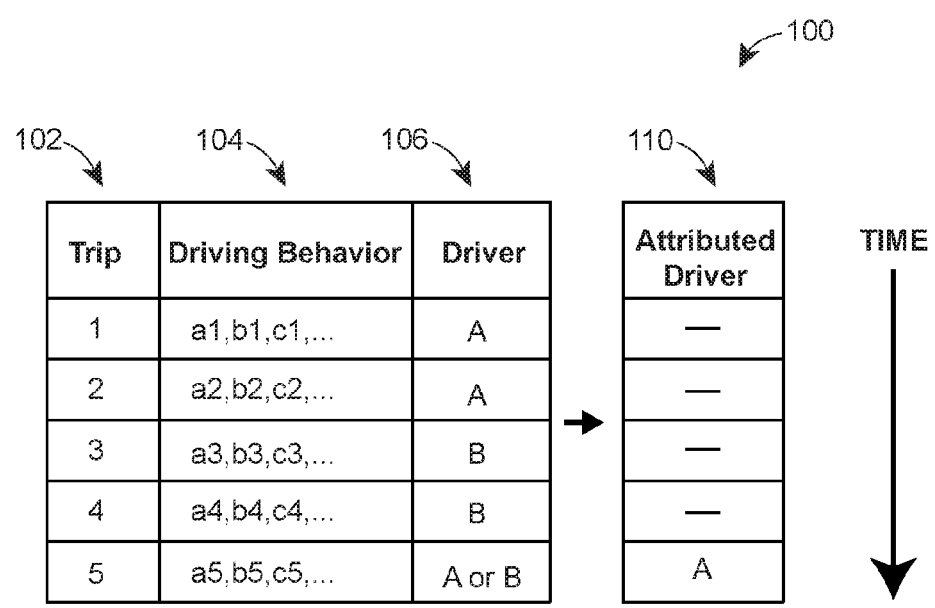
FIG. 2 depicts an exemplary process for attributing multiple sets of vehicle telematics data to individuals within a particular pool of drivers, according to one implementation and scenario.
Figure 3:
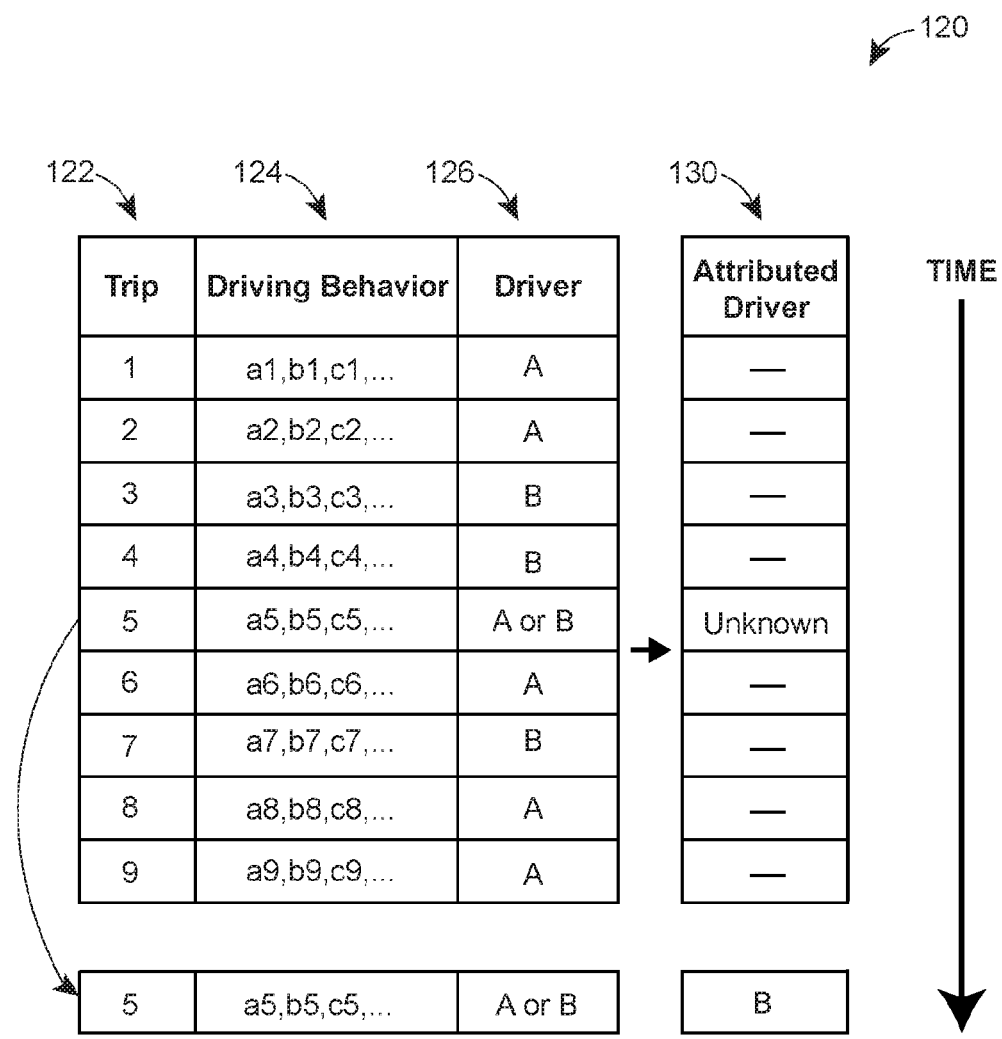
FIG. 3 depicts another exemplary process for attributing multiple sets of vehicle telematics data to individuals within a particular pool of drivers, according to one implementation and scenario.

Operation of the components of the environment 10 will now be described in connection with FIGS. 2 and 3, according to two implementations and scenarios. Referring first to FIG. 2, an example process 100 may be implemented in the environment 10. FIG. 2 corresponds to an example in which the pool of potential drivers includes exactly two drivers: Person A and Person B. Each of Trips 1 through 4 (of trips 102) corresponds to a different trip that was driven in the past while vehicle telematics data was collected. In FIG. 2, each trip of trips 102 occurred at a later time than the previous (next lower-numbered) trip.

Each of the trips 102 may be associated with its own set of vehicle telematics data. Model generation unit 32 may process those sets of data to calculate metric sets 104, with each metric of each metric set reflecting a different driving behavior. Each metric letter in FIG. 2 ("a," "b" or "c") represents a particular type of metric corresponding to a particular driving behavior. For example, all metrics staring with the letter "a" may measure "smooth" driving, all metrics starting with the letter "b" may measure average tailgating distance, and so on. Each concatenation of a metric letter and a trip number (e.g., "a1," "a2," etc.) represents a particular metric value. For example, "a1" may represent a score of 72 for smooth driving during Trip 1, "b1" may represent a score of 45 for average tailgating distance during Trip 1, "a2" may represent a score of 87 for smooth driving during Trip 2, and so on. Any number of metrics may be included in each of the metric sets 104 (e.g., more or fewer than three metrics per metric set 104). Moreover, while FIG. 2 shows metric sets 104 for five trips 102, other scenarios may include metric sets for more or fewer trips.

Drivers 106 are, for Trips 1 through 4, the individuals that are known to have driven the corresponding trips (i.e., Person A for Trips 1 and 2, and Person B for Trips 3 and 4). The driver may be known for each of Trips 1 through 4 for various different reasons. For example, Person A and Person B may each have a personal data collection device (e.g., data collection device 14 and 16, respectively, of FIG. 1), and Trips 1 and 2 may correspond to vehicle telematics data collected by the personal device of Person A (with no corresponding data from the personal device of Person B, or any other person, being provided) while Trips 3 and 4 may correspond to vehicle telematics data collected by the personal device of Person B (with no corresponding data from the personal device of Person A, or any other person, being provided). Trip 5, however, may represent an instance where personal data collection devices of both Person A and Person B were used to collect the vehicle telematics data sets during the same trip, with it being unknown who was driving and who was in a passenger seat. Thus, as seen in FIG. 2, the driver associated with Trip 5 is only restricted to the driver pool containing Person A and Person B.

In some implementations and/or scenarios, model generation unit 32 processes the metric sets (of metric sets 104) associated with Trips 1 through 4 to generate a custom statistical model specific to Person A and Person B, as described above. The trigger for generating the custom statistical model may vary according to different implementations and/or scenarios. For example, model generation unit 32 may have decided, at an earlier time, to generate the custom statistical model in response to an indication that Person A and Person B are both listed on the same insurance policy. As another example, model generation unit 32 may generate the custom statistical model later, in response to receiving vehicle telematics data for Trip 5 from data collection devices of both Person A and Person B (e.g., in response to determining that identification of the driver of Trip 5 is subject to ambiguity).

The specific types of metrics included in metric sets 104 (e.g., at least "a," "b" and "c" in the example of FIG. 2) may have been identified by model generation unit 32 during the model generation process. Once the custom statistical model is built (e.g., key metrics identified and/or weighted, clusters for known drivers mapped out and/or average metric values determined for known drivers, etc.), statistical analysis unit 34 may process the vehicle telematics data for Trip 5 according to the model. This processing may include calculating (and possibly weighting) the metrics "a5," "b5," "c5," etc., as well as any further processing required by the model (e.g., mapping the metric set to an N-dimensional space and determining the distances to clusters associated with Person A and Person B, respectively). Statistical analysis unit 34 may output the results of the processing (e.g., the distances to the centroids of the two clusters), and attribution unit 36 may analyze/process those results to identify the driver. In the scenario of FIG. 2, Person A is identified as the driver. Thus, attribution unit 36 may assign Trip 5 to Person A (e.g., by modifying data in a relational database).

In various different implementations and/or scenarios, the Trip 5 vehicle telematics data that is processed according to the custom statistical model may be data collected by the data collection device of Person A, data collected by the data collection device of Person B, or a combination of both. In some implementations, for example, both sets of vehicle telematics data are processed, and the results for both are used or to provide redundancy in the analysis. Distances to centroids of clusters associated with Person A and Person B may be averaged based on the results of processing the two sets of data, for example.

In some scenarios, some of the vehicle telematics data used to generate the custom statistical model may be more recent than the vehicle telematics data that is processed according to that model. One such scenario is shown in process 120 of FIG. 3. In the process 120, trips 122, metric sets 124 and drivers 126 may be the same as trips 102, metric sets 104 and drivers 106 of process 100. Here, however, it is seen that vehicle telematics data is gathered for Trips 6 through 9 before a driver has been attributed/assigned to Trip 5. Moreover, each of Trips 6 through 9, like Trips 1 through 4, has a known driver. The process 120 may generally be similar to the process 100, with the exception that model generation unit 32 generates the custom statistical model based on the vehicle telematics data for Trips 1 through 4 and 6 through 9. For example, model generation unit 32 may operate according to a rule specifying that a custom statistical model will not be generated unless certain criteria are met (e.g. telematics data must be available for at least eight trips total, with at least three of those being known to correspond to each driver in the pool, etc.).

The use of additional trips generally allows the custom statistical model to be better at identifying the correct driver. In the scenario of FIG. 3, for instance, the extra trips/data causes model generation unit 32 to generate a model that, when used by statistical analysis unit 34 to process the vehicle telematics data for Trip 5, results in Person B being attributed as the driver (rather than Person A, as shown in FIG. 2). Due to the increased accuracy as more data sets are accumulated, some implementations may update earlier assignments at later times. For example, attribution unit 36 may have assigned Trip 5 to Person A at a first time (before data for Trips 6 through 9 was available), and re-assigned Trip 5 to Person B at a second, later time (after data for Trips 6 through 9 was available). In still other implementations, a person may be considered a "known" driver for a particular trip once attribution unit 36 assigns that trip to that person. For example, a new custom statistical model may be generated after Trip 5 is assigned to Person B per the process 120, with the vehicle telematics data for Trip 5 being used by model generation unit 32 to help build that model.

Figure 4:
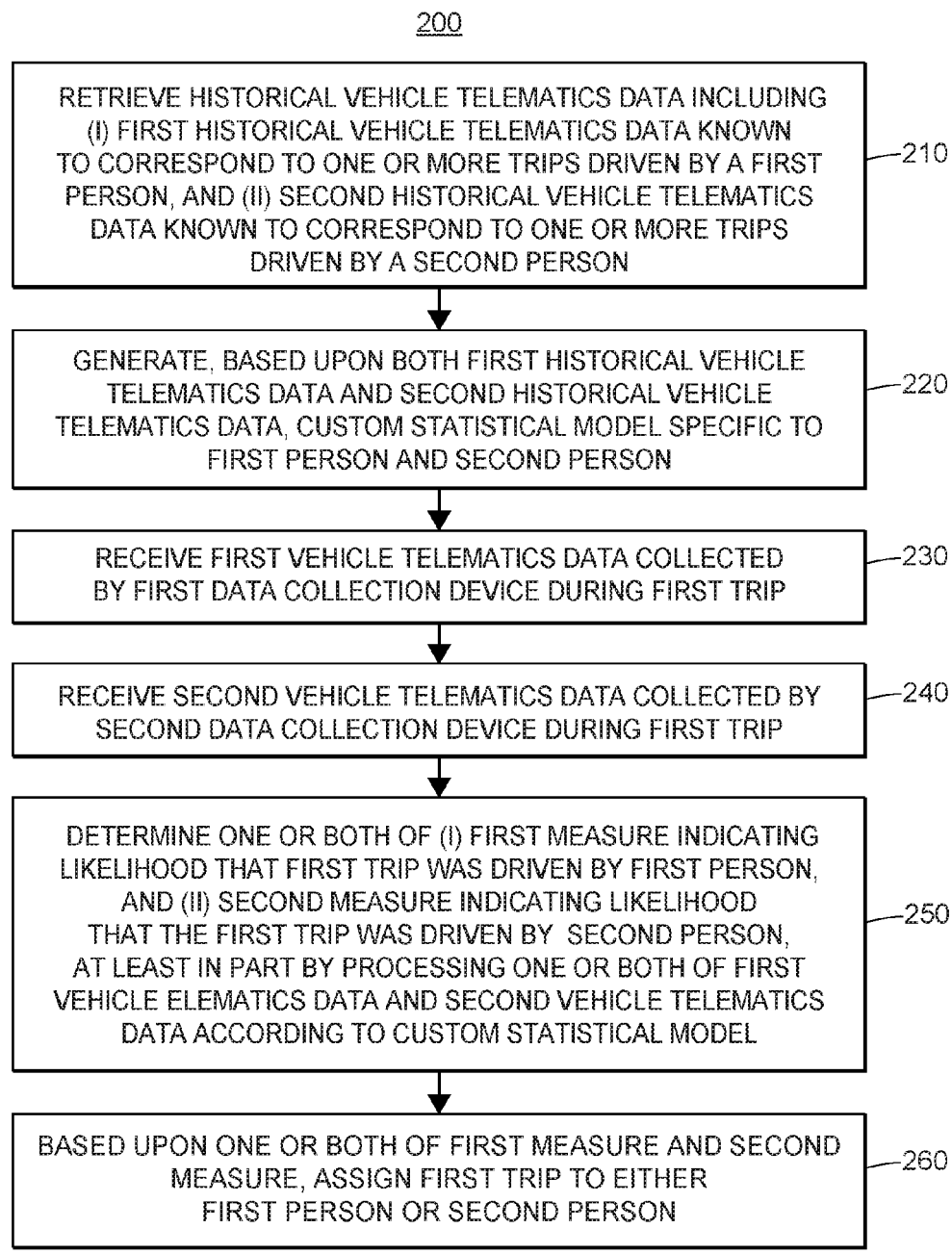
FIG. 4 is a flow diagram of an exemplary method for identifying a driver in the presence of vehicle telematics data from multiple data collection devices, according to one implementation.

FIG. 4 depicts a flow diagram of an exemplary method 200 for identifying a driver in the presence of vehicle telematics data from multiple data collection devices, according to one embodiment. In one embodiment, the method 200 may be implemented in (e.g., performed by one or more processors of) a server, such as server 24 of FIG. 1, when executing instructions stored in a memory, such as memory 26 of FIG. 1, for example. As used herein, the term "server" may refer to a single computing device at a single location, or to a number of computing devices distributed across a number of different locations.

In the method 200, historical vehicle telematics data may be retrieved (block 210). The historical vehicle telematics data may be retrieved from a database such as vehicle telematics database 40 of FIG. 1, for example. The historical vehicle telematics data may include first historical vehicle telematics data that is known to correspond to one or more trips driven by a first person, and second historical vehicle telematics data that is known to correspond to one or more trips driven by a second person, and the first historical vehicle telematics data and the second historical vehicle telematics data may be indicative of a plurality of driving behaviors for the first person and the second person, respectively. The first and second persons may be "known" to be the drivers for the respective historical data sets for different reasons in different implementations and/or scenarios. For instance, all of the first historical vehicle telematics data may have been collected from a mobile electronic device (e.g., a smart phone) of the first person and all of the second historical vehicle telematics data may have been collected from a mobile electronic device of the second person, with only one set of vehicle telematics data being available for each corresponding trip (e.g., with no trips being associated with telematics data from multiple mobile electronic devices). The first and second historical vehicle telematics data may each be "indicative" of the plurality of driving behaviors by way of containing enough information to enable the calculation of metrics that represent those driving behaviors, for example. Moreover, the first and second historical vehicle telematics data may include any suitable type of sensed and/or monitored data, such as GPS data, accelerometer data, gyroscope data, and/or any of the types of vehicle telematics data discussed above in connection with FIG. 1, for example.

Based upon both the first historical vehicle telematics data and the second historical vehicle telematics data, a custom statistical model that is specific to the first person and the second person may be generated (block 220). The custom statistical model may give greater weight to those driving behaviors (of which the first and second vehicle telematics data are indicative) that have greater predictive power with respect to distinguishing driving by the first person from driving by the second person. Conversely, the custom statistical model may give less or no weight to those driving behaviors having less or no predictive power with respect to distinguishing driving by the first person from driving by the second person. The custom statistical model may be generated using a machine learning algorithm, for example.

In some implementations, generating the custom statistical model includes generating driving behavior metrics. For example, generating the custom statistical model may include generating, based upon the first historical vehicle telematics data, first driving behavior metrics each corresponding to a respective one of the plurality of driving behaviors, and generating, based upon the second historical vehicle telematics data, second driving behavior metrics each corresponding to a respective one of the plurality of driving behaviors. In such an implementation, generating the custom statistical model may further include determining, based upon the first driving behavior metrics and the second driving behavior metrics, a set of key driving behavior metrics having relatively high predictive power.

First vehicle telematics data, collected by a first data collection device (e.g., a smart phone or other mobile electronic device owned by or otherwise associated with the first person) during a first trip, may be received (block 230). The first data collection device may be similar to any of the different implementations discussed above (e.g., a personal mobile electronics device, including one or multiple components, etc.). The first vehicle telematics data may be received by any suitable technique(s), such as any of the techniques for obtaining vehicle telematics data described above in connection with FIG. 1 (e.g., transferring to/from a portable memory, using wired and/or wireless communications, etc.), for example. The first vehicle telematics data may include data indicative of some or all of the same types of driving behaviors as the historical vehicle telematics retrieved at block 210, but for a trip that is not represented by the historical vehicle telematics data.

Second vehicle telematics data, collected by a second data collection device (e.g., a smart phone or other mobile electronic device owned by or otherwise associated with the second person) during the same, first trip, may be received (block 240). That the data corresponds to the same trip as the data received at block 230 may be determined based on GPS data, for example. The second data collection device may be similar to any of the different implementations discussed above (e.g., a personal mobile electronics device, including one or multiple components, etc.), and may be of the same general type as the first data collection device, or a different type. The second vehicle telematics data may be received by any suitable technique(s), such as any of the techniques for obtaining vehicle telematics data described above in connection with FIG. 1, for example. The second vehicle telematics data may include data indicative of some or all of the same types of driving behaviors as the first vehicle telematics data received at block 230.

A first measure and/or a second measure may be determined (block 250), at least in part by processing the first vehicle telematics data and/or the second vehicle telematics data according to the custom statistical model. The first measure may indicate the likelihood that the first trip was driven by the first person, and the second measure (if also determined) may indicate the likelihood that the first trip was driven by the second person. As just one example, in an implementation where key driving behavior metrics are determined at block 220, the first vehicle telematics data and/or the second vehicle telematics data may be processed to calculate a first and/or second set of driving behavior metrics, with each set of driving behavior metrics corresponding to one of the key driving behavior metrics. The first measure may then be equal to the distance from the first set of driving behavior metrics to a centroid of a cluster associated with the historical driving behavior metrics for the first person, and/or the second measure may then be equal to the distance from the second set of driving behavior metrics to a centroid of a cluster associated with historical driving behavior metrics for the second person.

Based upon the first measure and/or the second measure, the first trip may be assigned to either the first person or the second person (block 260). The first trip may be "assigned" by way of setting a value in a relational database (e.g., in vehicle telematics database 40), for example. For instance, if the first and second measure are both calculated at block 250, and if both measures are distances to cluster centroids, then it may be determined at block 260 which distance is smaller, and the person associated with the closer cluster centroid may be assigned as the driver for the first trip.

In some implementations, the method 200 may include one or more blocks not shown in FIG. 4. For example, the method 200 may include an additional block, after block 260, in which an insurance rating, associated with an insurance policy of the first and/or second person, is caused to be adjusted based at least in part upon the first and/or second vehicle telematics data and whether the first trip was assigned to the first person or the second person. As another example, the method 200 may include additional blocks in which third vehicle telematics data (collected by the first data collection device during a second trip) is received, fourth vehicle telematics data (collected by the second data collection device during the second trip) is received, a third measure (indicating likelihood that the second trip was driven by the first person) and/or a fourth measure (indicating likelihood that the second trip was driven by the second person) is/are determined at least in part by processing the third vehicle telematics data and/or the fourth vehicle telematics data according to the custom statistical model, and the second trip is assigned to an "unknown driver" category based upon the third measure and/or the fourth measure. The second trip may be assigned to the unknown driver category after determining that the third and fourth measures both fail to meet a particular threshold (e.g., a maximum distance to any cluster centroid), for example. As yet another example, the method 200 may include an additional block, prior to block 210, in which the first person and the second person are identified as being in the driver pool for the first trip (e.g., by identifying the users associated with the first and second data collection devices), Moreover, in some implementations and/or scenarios, the blocks of the method 200 may occur in a different order than that shown in FIG. 4. For example, blocks 210 and 220 may occur after blocks 230 and/or 240 (e.g., the "historical" vehicle telematics data may be data that was collected and/or retrieved after the vehicle telematics data received at blocks 230 and/or 240).

Figure 5:
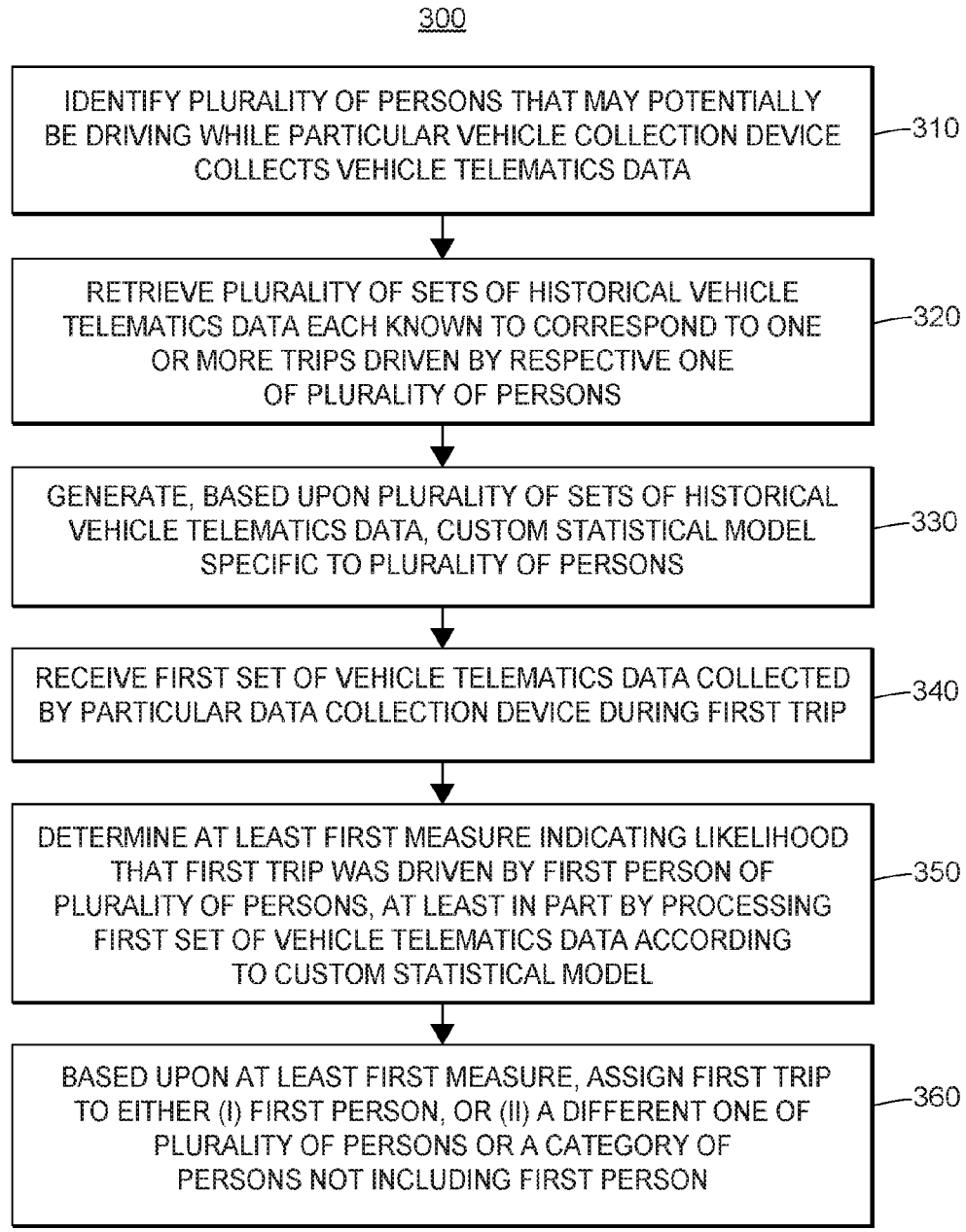
FIG. 5 is a flow diagram of an exemplary method for identifying a driver given a limited pool of potential drivers, according to one implementation.

FIG. 5 depicts a flow diagram of an exemplary method 300 for identifying a driver given a limited pool of potential drivers, according to one embodiment. In one embodiment, the method 300 may be implemented in (e.g., performed by one or more processors of) a server, such as server 24 of FIG. 1, when executing instructions stored in a memory, such as memory 26 of FIG. 1, for example.

In the method 300, a plurality of persons that may potentially be driving while a particular data collection device collects vehicle telematics data (i.e., a particular driver pool) may be identified (block 310). The driver pool may be identified by accessing a database to identify an insurance policy associated with the particular data collection device. The data collection device may be a vehicle telematics system installed in a vehicle listed on the insurance policy or a mobile electronic device (e.g., owned by the primary insured), for example, and the driver pool may consist of all of the potential drivers listed on the policy.

A plurality of sets of historical vehicle telematics data, each known to correspond to one or more trips driven by a respective one of the plurality of persons identified at block 310, may be retrieved (block 320). The sets of data may be retrieved from a database such as the vehicle telematics database 40 of FIG. 1, for example. Each of the retrieved sets of data may be indicative of a plurality of driving behaviors for the respective person. Block 320 may be similar to block 210 of FIG. 1, for example, but for the more general case where there may be more than two known drivers/persons.

Based upon the retrieved sets of historical vehicle telematics data, a custom statistical model that is specific to the plurality of persons may be generated (block 330). The custom statistical model may give greater weight to those driving behaviors, of the plurality of driving behaviors, that have greater predictive power with respect to distinguishing driving by different persons among the plurality of persons. Conversely, the custom statistical model may give less or no weight to those driving behaviors, of the plurality of driving behaviors, having less or no predictive power with respect to distinguishing driving by different persons among the plurality of persons. Block 330 may be similar to block 220 of FIG. 4, for example, but for the more general case in which there may be more than two potential drivers.

In some implementations and scenarios where there are more than two drivers in the pool, the custom statistical model is optimized or designed to distinguish driving of the first person from driving of all other persons in the driver pool. For example, the custom statistical model may give greater weight to those driving behaviors, of the plurality of driving behaviors, that have greater predictive power with respect to distinguishing driving by the first person from all other persons of the plurality of persons, and give less or no weight to those driving behaviors, of the plurality of driving behaviors, that have less or no predictive power with respect to distinguishing driving by the first person from all other persons of the plurality of persons. Alternatively, the custom statistical model may be optimized or designed to distinguish driving of each and every person in the driver pool from driving of all other persons in the driver pool. For example, the custom statistical model may give greater weight to those driving behaviors, of the plurality of driving behaviors, that have greater predictive power with respect to distinguishing driving by each person of the plurality of persons from all other persons of the plurality of persons, and give less or no weight to those driving behaviors, of the plurality of driving behaviors, that have less or no predictive power with respect to distinguishing driving by each person of the plurality of persons from all other persons of the plurality of persons.

A first set of vehicle telematics data, collected by the data collection device associated with the driver pool during a first trip, may be received (block 340). Block 340 may be similar to block 230 of FIG. 4, for example.

At least a first measure may be determined (block 350), at least in part by processing the first set of vehicle telematics data according to the custom statistical model. The first measure may indicate the likelihood that the first trip was driven by a first person of the plurality of persons. For example, the first measure may be a distance of a driving behavior metric set to a centroid of a cluster of driving behavior metric sets known to correspond to the first person. In some implementations, similar measures are determined for one or more other persons in the driver pool.

Based upon the first measure (and potentially other measures determined at block 350), the first trip may be assigned to either the first person, or to another person or category (block 360). If not assigned to the first person, for example, the first trip may be assigned to a different one of the plurality of persons, or to a category of persons that does not include the first person (e.g., an "other" category generally representing all persons, other than the first person, within the plurality of persons). The first trip may be assigned to a particular person or category at block 360 by way of setting a value in a relational database (e.g., in vehicle telematics database 40), for example.

In some implementations, the method 300 may include one or more blocks not shown in FIG. 5. For example, the method 300 may include an additional block, after block 360, in which an insurance rating, associated with an insurance policy specifying at least one of the plurality of persons, is caused to be adjusted based at least in part upon the first set of vehicle telematics data and whether the first trip was assigned to the first person. Moreover, in some implementations and/or scenarios, the blocks of the method 300 may occur in a different order than that shown in FIG. 5. For example, blocks 320 and 330, and possibly also block 310, may occur after block 340.

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process of identifying drivers among a limited pool of potential drivers. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. §112(f) unless traditional means-plus-function language is expressly recited, such as "means for" or "step for" language being explicitly recited in the claim(s).

What is claimed:

1. A method of identifying a driver in the presence of vehicle telematics data from multiple data collection devices, the method comprising:
retrieving, by a server and from a vehicle telematics database, historical vehicle telematics data including (i) first historical vehicle telematics data known to correspond to one or more trips driven by a first person, and (ii) second historical vehicle telematics data known to correspond to one or more trips driven by a second person, wherein the first historical vehicle telematics data and the second historical vehicle telematics data are indicative of a plurality of driving behaviors for the first person and the second person, respectively;

generating, by the server and based upon both the first historical vehicle telematics data and the second historical vehicle telematics data, a custom statistical model specific to the first person and the second person, wherein the custom statistical model (i) gives greater weight to those driving behaviors, of the plurality of driving behaviors, having greater predictive power with respect to distinguishing driving by the first person from driving by the second person, and (ii) gives less or no weight to those driving behaviors, of the plurality of driving behaviors, having less or no predictive power with respect to distinguishing driving by the first person from driving by the second person;

receiving, at the server, first vehicle telematics data collected by a first data collection device during a first trip;

receiving, at the server, second vehicle telematics data collected by a second data collection device during the first trip;

determining, by the server, one or both of (i) a first measure indicating likelihood that the first trip was driven by the first person, and (ii) a second measure indicating likelihood that the first trip was driven by the second person, at least in part by processing one or both of the first vehicle telematics data and the second vehicle telematics data according to the custom statistical model; and based upon one or both of the first measure and the second measure, assigning, by the server, the first trip to either the first person or the second person.

2. The method of claim 1, wherein the first historical vehicle telematics data and the second historical vehicle telematics data each include at least two of (i) global positioning satellite (GPS) data, (ii) accelerometer data, and (iii) gyroscope data.

3. The method of claim 1, wherein:

receiving first vehicle telematics data collected by a first data collection device includes receiving first vehicle telematics data collected by a first mobile electronic device, associated with the first person, during the first trip; and receiving second vehicle telematics data collected by a second data collection includes receiving second vehicle telematics data collected by a second mobile electronic device, associated with the second person, during the first trip.

4. The method of claim 1, further comprising:

receiving, at the server, third vehicle telematics data collected by the first data collection device during a second trip;

receiving, at the server, fourth vehicle telematics data collected by the second data collection device during the second trip;

determining, by the server, one or both of (i) a third measure indicating likelihood that the second trip was driven by the first person, and (ii) a fourth measure indicating likelihood that the second trip was driven by the second person, at least in part by processing one or both of the third vehicle telematics data and the fourth vehicle telematics data according to the custom statistical model; and based upon one or both of the third measure and the fourth measure, assigning, by the server, the second trip to an unknown driver category.

5. The method of claim 4, wherein assigning the second trip to the unknown driver category includes determining that the third measure and the fourth measure both fail to meet a threshold.

6. The method of claim 1, further comprising:

causing, by the server, an insurance rating, associated with an insurance policy of one or both of the first person and the second person, to be adjusted based at least in part upon (i) one or both of the first vehicle telematics data and the second vehicle telematics data and (ii) whether the first trip was assigned to the first person or the second person.

7. The method of claim 1, wherein generating the custom statistical model specific to the first person and the second person includes generating the custom statistical model using a machine learning algorithm.

8. The method of claim 1, wherein:

generating the custom statistical model includes (i) generating, based upon the first historical vehicle telematics data, first driving behavior metrics each corresponding to a respective one of the plurality of driving behaviors, (ii) generating, based upon the second historical vehicle telematics data, second driving behavior metrics each corresponding to a respective one of the plurality of driving behaviors, and (iii) determining, based upon the first driving behavior metrics and the second driving behavior metrics, a set of key driving behavior metrics having relatively high predictive power; and processing one or both of the first vehicle telematics data and the second vehicle telematics data according to the custom statistical model includes one or both of (i) generating, based upon the first vehicle telematics data, third driving behavior metrics each corresponding to a respective one of the set of key driving behavior metrics, and (ii) generating, based upon the second vehicle telematics data, fourth driving behavior metrics each corresponding to a respective one of the set of key driving behavior metrics.

9. A server comprising:

one or more processors; and a memory storing instructions that, when executed by the server, cause the server to retrieve, from a vehicle telematics database, historical vehicle telematics data including (i) first historical vehicle telematics data known to correspond to one or more trips driven by a first person, and (ii) second historical vehicle telematics data known to correspond to one or more trips driven by a second person, wherein the first historical vehicle telematics data and the second historical vehicle telematics data are indicative of a plurality of driving behaviors for the first person and the second person, respectively, generate, based upon both the first historical vehicle telematics data and the second historical vehicle telematics data, a custom statistical model specific to the first person and the second person, wherein the custom statistical model (i) gives greater weight to those driving behaviors, of the plurality of driving behaviors, having greater predictive power with respect to distinguishing driving by the first person from driving by the second person, and (ii) gives less or no weight to those driving behaviors, of the plurality of driving behaviors, having less or no predictive power with respect to distinguishing driving by the first person from driving by the second person, receive first vehicle telematics data collected by a first data collection device during a first trip, receive second vehicle telematics data collected by a second data collection device during the first trip, determine one or both of (i) a first measure indicating likelihood that the first trip was driven by the first person, and (ii) a second measure indicating likelihood that the first trip was driven by the second person, at least in part by processing one or both of the first vehicle telematics data and the second vehicle telematics data according to the custom statistical model, and based upon one or both of the first measure and the second measure, assign the first trip to either the first person or the second person.

10. The server of claim 9, wherein the first historical vehicle telematics data and the second historical vehicle telematics data each include at least two of (i) global positioning satellite (GPS) data, (ii) accelerometer data, and (iii) gyroscope data.

11. The server of claim 9, wherein the instructions further cause the server to:

cause an insurance rating, associated with an insurance policy of one or both of the first person and the second person, to be adjusted based at least in part upon (i) one or both of the first vehicle telematics data and the second vehicle telematics data and (ii) whether the first trip was assigned to the first person or the second person.

12. The server of claim 9, wherein the instructions cause the server to generate the custom statistical model specific to the first person and the second person using a machine learning algorithm.

13. A method of identifying a driver given a limited pool of potential drivers, the method comprising:

identifying, by a server, a plurality of persons that may potentially be driving while a particular data collection device collects vehicle telematics data;

retrieving, by the server and from a vehicle telematics database, a plurality of sets of historical vehicle telematics data each known to correspond to one or more trips driven by a respective one of the plurality of persons, wherein each set of the plurality of sets of historical vehicle telematics data is indicative of a plurality of driving behaviors for the respective one of the plurality of persons;

generating, by the server and based upon the plurality of sets of historical vehicle telematics data, a custom statistical model specific to the plurality of persons, wherein the custom statistical model (i) gives greater weight to those driving behaviors, of the plurality of driving behaviors, having greater predictive power with respect to distinguishing driving by different persons among the plurality of persons, and (ii) gives less or no weight to those driving behaviors, of the plurality of driving behaviors, having less or no predictive power with respect to distinguishing driving by different persons among the plurality of persons;

receiving, at the server, a first set of vehicle telematics data collected by the particular data collection device during a first trip;

determining, by the server, at least a first measure indicating likelihood that the first trip was driven by a first person of the plurality of persons, at least in part by processing the first set of vehicle telematics data according to the custom statistical model; and based upon at least the first measure, assigning, by the server, the first trip to either (i) the first person, or (ii) a different one of the plurality of persons or a category of persons that does not include the first person.

14. The method of claim 13, wherein each set of the plurality of sets of historical vehicle telematics data includes at least two of (i) global positioning satellite (GPS) data, (ii) accelerometer data, and (iii) gyroscope data.

15. The method of claim 13, wherein:

identifying a plurality of persons that may potentially be driving while a particular vehicle collection device collects vehicle telematics data includes identifying a plurality of persons that may potentially be driving while a mobile electronic device collects vehicle telematics data, at least in part by identifying an insurance policy associated with the mobile electronic device; and the insurance policy specifies that each of the plurality of persons is a potential driver under the insurance policy.

16. The method of claim 13, wherein:

identifying a plurality of persons that may potentially be driving while a particular vehicle collection device collects vehicle telematics data includes identifying a plurality of persons that may potentially be driving while a vehicle telematics system installed in a vehicle collects vehicle telematics data, at least in part by identifying an insurance policy associated with the vehicle telematics system; and the insurance policy specifies that each of the plurality of persons is a potential driver under the insurance policy.

17. The method of claim 13, generating the custom statistical model specific to the plurality of persons includes generating the custom statistical model using a machine learning algorithm.

18. The method of claim 13, further comprising:

causing, by the server, an insurance rating, associated with an insurance policy specifying at least one of the plurality of persons, to be adjusted based at least in part upon (i) the first set of vehicle telematics data and (ii) whether the first trip was assigned to the first person.

19. The method of claim 13, wherein the custom statistical model (i) gives greater weight to those driving behaviors, of the plurality of driving behaviors, having greater predictive power with respect to distinguishing driving by the first person from all other persons of the plurality of persons, and (ii) gives less or no weight to those driving behaviors, of the plurality of driving behaviors, having less or no predictive power with respect to distinguishing driving by the first person from all other persons of the plurality of persons.

20. The method of claim 13, wherein the custom statistical model (i) gives greater weight to those driving behaviors, of the plurality of driving behaviors, having greater predictive power with respect to distinguishing driving by each person of the plurality of persons from all other persons of the plurality of persons, and (ii) gives less or no weight to those driving behaviors, of the plurality of driving behaviors, having less or no predictive power with respect to distinguishing driving by each person of the plurality of persons from all other persons of the plurality of persons.

* * * * *